July 8, 1969    J. R. JOHNSTON    3,454,047
FLUID LINE COUPLER
Filed May 6, 1966

INVENTOR.
JAMES R. JOHNSTON
BY
Richard K. MacNeill

United States Patent Office 3,454,047
Patented July 8, 1969

3,454,047
FLUID LINE COUPLER
James R. Johnston, 4021 La Salle St.,
San Diego, Calif. 92110
Filed May 6, 1966, Ser. No. 548,217
Int. Cl. F16l 29/00, 35/00, 55/00
U.S. Cl. 137—614.04                                   5 Claims

ABSTRACT OF THE DISCLOSURE

A fluid line coupler with a spring-loaded shut-off valve on each mating end for shutting off fluid upon disconnection; a pair of expandable jaws carrying a slidable locking sleeve thereon; a mating member for cooperation with the expandable jaws for holding the coupler together when the mating section is placed within the expandable jaws and the locking sleeve moved into a retaining position over the expandable jaws; the shut off valve on each mating end opening upon interconnection with the expandable jaws and the mating member.

---

Figure 1:
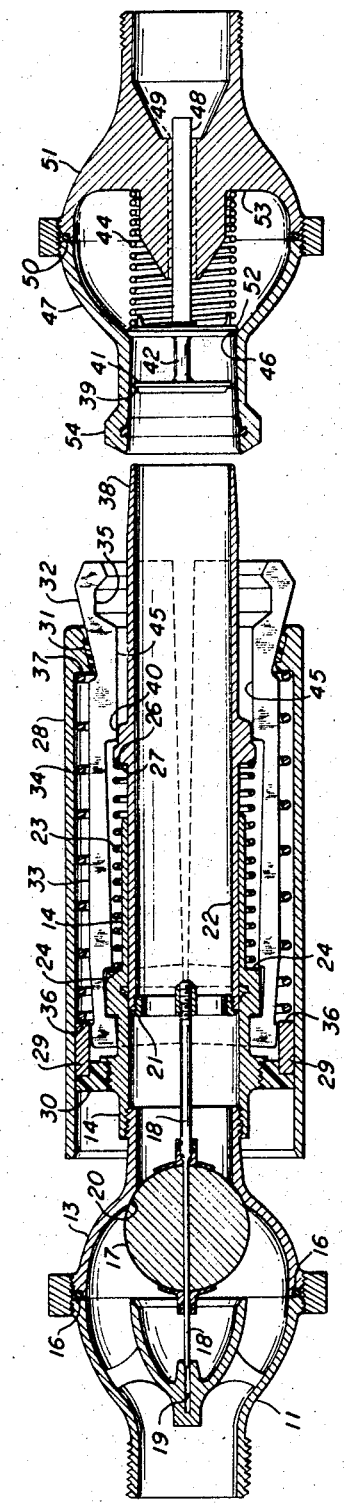

The present invention relates to a fluid line coupler and more particularly to a fluid line coupler having automatic connecting and disconnecting features with an automatic shut-off valve on each end thereof.

Fluid line couplers have been plagued with three main disadvantages. The first disadvantage is in the actual connecting operation requiring clamps, threaded engagements, etc., being cumbersome and time-consuming. The second disadvantage particularly in areas such as air-to-air refueling, etc., lay in the absence of an automatic disconnect when a predetermined tension is reached. The third disadvantage lay in the absence of workable automatic shut-off valves when the connect coupler is disconnected.

According to the invention, a fluid line coupler is provided having an automatic shut-off valve on each cooperating end for shutting off fluid automatically upon a disconnection. A locking feature automatically couples the fluid line when one mating part is placed within another, requiring no external clamping or threaded engagement. The clamping mechanism has a spring-biased external sleeve holding it firmly clamped in place unless a predetermined stress is put upon the line tending to pull the coupler apart. When this predetermined stress is reached, the sleeve will recess allowing the clamping mechanism to open, disconnecting the coupler. At this time a valve in each half of the coupler automatically closes, shutting off fluid to each end of the coupler.

An object of the present invention is the provision of a fluid line coupler having automatic clamping.

Another object is to provide a fluid line coupler which automatically disconnects under a predetermined stress.

A further object of the invention is the provision of a fluid line coupler having an automatic shut-off on each end upon disconnection thereof.

Still another object is to provide a fluid line coupler which is compact and light in weight.

Yet another object is to provide a fluid line coupler which is inexpensive to manufacture, simple to assemble, and extremely convenient to use.

Figure 2:
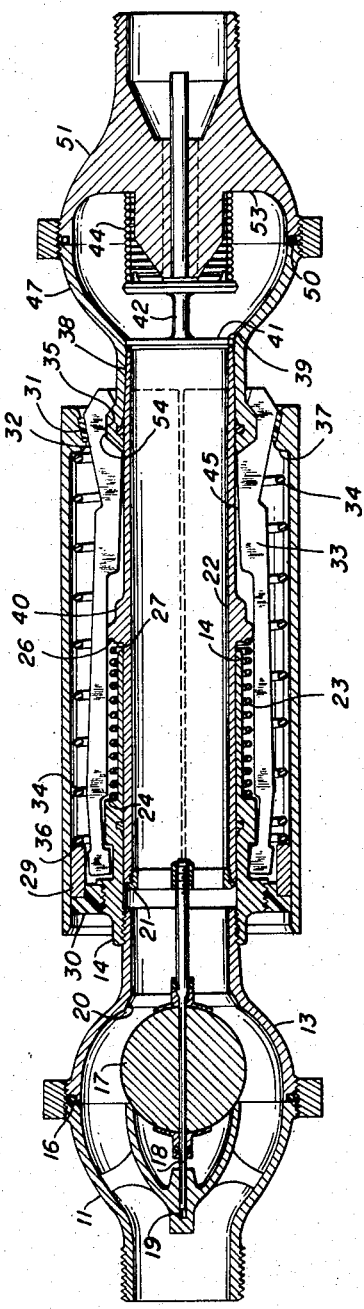

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 1 is a sectional view of the preferred embodiment of the present invention shown disconnected; and FIG. 2 is a sectional view of the embodiment of FIG. 1 shown in the engaged position.

Referring to FIGS. 1 and 2, fitting 11 is threadably engaged with fitting 13 which is in turn threadably engaged with retaining nut 14. O-ring 16 effects a seal at the threadable engagement of intake line 11 and fitting 13. Sphere valve 17 is carried by a shaft 18, which in turn is received by recess 19 and is in threadable engagement with a tension spider-ring 21. Tension spider-ring 21 is in threadable engagement with cylinder 22 which is slidably received within member 14. A tension spring 23 is carried by member 14 and abuts shoulder 24 of member 14 on one end and recess 26 of shoulder 27 of cylinder 22 on the other end.

Outer sleeve 28 is slidably carried by a brass ring 29 and has an embedded Teflon ring 31 which is slidably carried by inclined surface 32 of expandable jaws 33. Tension spring 34 is slidably received within outer sleeve 28 and rests on surface 36 of brass ring 29 on one end and shoulder 37 of outer sleeve 28 on the other end. Retaining nut 30 is in threadable engagement with retaining nut 14 and serves to retain brass ring 29.

One end 38 of cylinder 22 is slightly tapered to facilitate an easily slidable fit within fitting 47. End 38 of cylinder 22 is dimensioned for a snug fit within recess 39 of tension ring 41. Tension ring 41 is connected by shaft 42 to a disc valve 43. Coil spring 44 forces disc valve 43 against inner surface 46 of fitting 47. Disc valve 43 is coupled to a shaft 48 which is slidably carried by bore 49 in fitting 51. Coil spring 44 abuts face 52 of disc valve 43 on one end and shoulder 53 of fitting 51 on the other end. Fitting 51 is threadable engaged with fitting 47, O-ring 50, effecting a hermetic seal.

It is pointed out that all of the parts with the exception of bolts 30 are circular in cross section so further illustration is deemed unnecessary.

Operation

Referring back to FIG. 1, the coupler is shown in its disconnected or de-coupled position. Here, outer sleeve 28 has been slidably recessed along spacing ring 29 and inclined surface 32 of expandable jaws 33 to allow expandable jaws 33 to open by their own spring tension. When this happens, tension spring 23 acting against shoulder 27 of cylinder 22 forces raised portion 40 into the reduced diameter area 45 of expandable jaws 33 holding them open. At the same time tension ring 21 is also pulled to the right carrying with it threaded rod 18 which seats spherical valve 17 against inner surface 20 of fitting 13 closing fitting 11 off.

When tapered end 38 of cylinder 22 is removed from fitting 47, tension spring 44, working against surface 52 of disc valve 43, forces disc valve 43 into abutment with inner surface 46 of fitting 47 as shown, sealing off fitting 47.

Referring to FIG. 2, when tapered end 38 of cylinder 22 is forced into fitting 47, contact will be made with recess 39 of tension ring 41 forcing it and disc valve 43 via shaft 42 into the position shown, compressing coil spring 44 and removing the seal between disc valve 43 and inner surface 46 of fitting 47. As disc valve 43 reaches the end of its travel, cylinder 22 is forced back to the left compressing tension spring 23 and removing raised portion 40 from reduced diameter section 45 of expandable jaws 33. When this happens, tension spring 34 acting against shoulder 37 of outer sleeve 28 pushes outer sleeve 28 to the right clamping recess 35 of expandable jaws 33 around lip 54 of fitting 47 and retaining the connection as shown. At the same time cylinder 22 was forced to the left, sphere valve 17 is also forced to the left via tension ring 21 and shaft 18 and the entire system is now open. Fluid can now flow through fittings 11 and 13, around sphere valve 17, through tension ring 21, cylinder 22, through tension ring 41, fitting 47, around disc valve 43, and through fitting 51.

Tension spring 34 has a preselected tension, which along with the angle of inclined surface 32, allows outer sleeve 28 to be forced to the left whenever a predetermined tension is applied, pulling lip 54 to the right. A force pulling lip 36 to the right will impart an opening force on expandable jaws 33 which result in imparting a vector to the left on Teflon insert 31 which in turn, forces outer sleeve 28 to the left allowing the coupler to automatically disconnect at a predetermined tension. The required force can be varied by varying the tension of tension spring 34 and the geometry of recess 34 as well as the angle of inclined surface 32.

It should be understood of course that the foregoing disclosure relates to only a preferred embodiment of the invention and that it is intended to cover all changes and modifications of the example of the invention herein chosen for the purposes of the disclosure, which do not constitute departures from the spirit and scope of the invention.

I claim:
1. A fluid line coupler for coupling first and second fluid lines comprising:
   a first cylinder having a retaining shoulder;
   a second cylinder slidably disposed within said first cylinder, said second cylinder having a retaining shoulder;
   a coiled spring carried by said first and second cylinders, said coiled spring being compressed between said first cylinder retaining shoulder and said second cylinder retaining shoulder;
   a plurality of expandable jaws having a first recess at one end thereof for cooperation with said first cylinder shoulder and being retained thereby;
   an outer sleeve slidably carried by said plurality of expandable jaws;
   spring-biasing means for biasing said outer sleeve towards an opening end of said expandable jaws;
   valve means coupled to said first and second cylinders, said valve means operable to seal one of said first fluid lines when said first cylinder is forced out of said expandable jaws and to open said first fluid lines when said second cylinder is forced within said expandable jaws; and
   second valve means slidably receiving said second cylinder, said second valve means operable to seal said second fluid line when said second cylinder is not slidably received therein and to open said second fluid line when said second cylinder is slidably received therein.

2. The fluid line coupler of claim 1 wherein said second valve means has a locking lip for cooperation with a recess on an internal surface of said plurality of expandable jaws.

3. The fluid line coupler of claim 1 wherein at least one of said valve means comprises a ball and socket valve.

4. The fluid line coupler of claim 1 wherein said second valve means comprises a spring-biased disc valve.

5. The fluid line coupler of claim 2 wherein said inclined surfaces and said inner surface recess and said locking lip are dimensioned to force said outer sleeve away from said expandable jaws upon a predetermined force in a direction to part said first and second fluid lines, thereby allowing said expandable jaws to open and decouple said second cylinder from said second valve.

References Cited

UNITED STATES PATENTS 2,951,713   9/1960   Hoffstrom _____ 137—614.03

FOREIGN PATENTS 347,844   5/1931   Great Britain.
863,055   12/1940   France.

ALAN COHAN, *Primary Examiner.*

HOWARD M. COHN, *Assistant Examiner.*

U.S. Cl. X.R.

285—1, 86, 316